Nov. 24, 1970 A. L. STANES 3,543,055

FOUR PHASE LOGIC SYSTEMS

Filed Sept. 23, 1968

INVENTOR

A. L. Stanes

BY

Watson Cole Grindle & Watson

ATTORNEYS

United States Patent Office 3,543,055
Patented Nov. 24, 1970

3,543,055
FOUR PHASE LOGIC SYSTEMS

Alan Leslie Stanes, London, England, assignor to Telephone Manufacturing Company Limited, London, England, a British company Filed Sept. 23, 1968, Ser. No. 761,652
Claims priority, application Great Britain, Oct. 9, 1967, 46,141/67
Int. Cl. H03k 23/08
U.S. Cl. 307—304 5 Claims

ABSTRACT OF THE DISCLOSURE

The specification of this application discloses arrangements for preventing charge-sharing between node and spurious capacitances of field effect transistors used in delay circuits of a four phase logic system.

Figure 1:
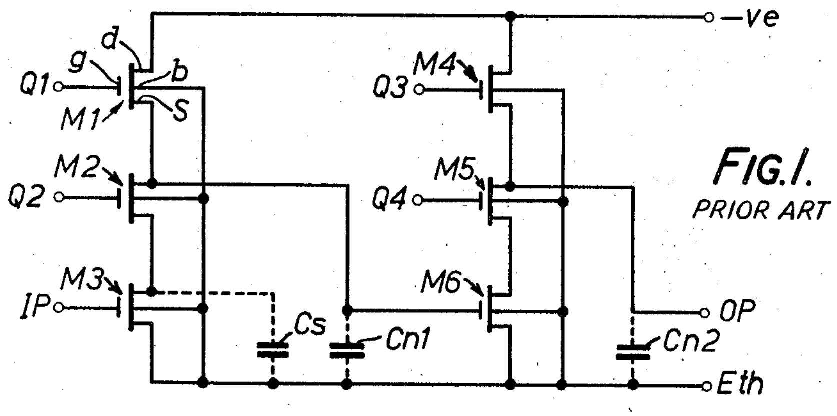

This invention relates to electronic delay stages and circuits particularly suited for use in so-called four-phase dynamic logic systems using Field Effect-Transistors (FETs).

A description of four-phase logic systems using Metal Oxide Semiconductor Transistors (MOSTs) is given in an article entitled "Use four-phase MOS IC logic" by Karp and De Atley, in Electronic Design, vol. 7, Apr. 1, 1967, page 62 et seq.

Dynamic logic of the type described in this article makes use of the node capacitance on the gate electrode of an FET as a signal storage means. In any particular integrated circuit delay stage, this node capacitance comprises a combination of the gate-to-substrate capacitance of the FET concerned, the drain-to-substrate capacitance of the previous FET in the circuit, and the metallising-to-substrate capacitance of the metallising forming the interconnection between the two FETs.

The node capacitance has a typical value ranging from one half to a few picofarads and, under circuit operating conditions, is charged by the brief application of a clock pulse. On disconnection of the clock pulse, the pulse potential is maintained on the gate electrode by the charged node capacitance for the period of the time constant formed by the node capacitance and the various leakage impedances. For correct operation of the logic sequence the application of the next clock pulse must occur within this time constant period and this sets the minimum speed of operation of the system.

In a four-phase logic delay stage the first phase clock pulse charges the node capacitance and the second phase clock pulse is used to sense the state of the logic input (i.e. a "0" or a "1"). If the input is a "0" the node capacitor is unaffected. If the input is a "1," the node capacitor is discharged.

During this sensing period, a further FET is connected in the circuit and this has the effect of connecting a further capacitance in parallel with the node capacitance. This additional, or "spurious" capacitance is that of the drain-to-substrate pn junction of the further FET. The charge on the node capacitance now has to be shared with the spurious capacitance if the latter is not already charged. This is generally known in the art as "charge sharing" and its effect is to reduce the potential across the node capacitance. The potential on the gate electrode is thus reduced and may affect the operation of the logic system since the potential representing the "logic 1 level" at which the system is designed to operate is not maintained.

It is an object of the invention to provide a delay stage which eliminates this problem of charge sharing.

According to the invention there is provided a clock controlled electronic delay stage comprising first and second field effect transistors, said first transistor having its drain electrode connected to a capacitative output storage means and its source electrode connected to the drain electrode of said second transistor, means for applying an input signal to the gate electrode of said second transistor, means for applying the first one of two consecutive clock pulses to both the drain and source electrodes of said second transistor and to the drain electrode of said first transistor, and means for applying the second of said two clock pulses to the gate electrode of said transistor, whereby an input signal applied to the gate electrode of said second transistor appears in inverted form at said output storage means with a delay determined by the clock pulse frequency.

Figure 2:
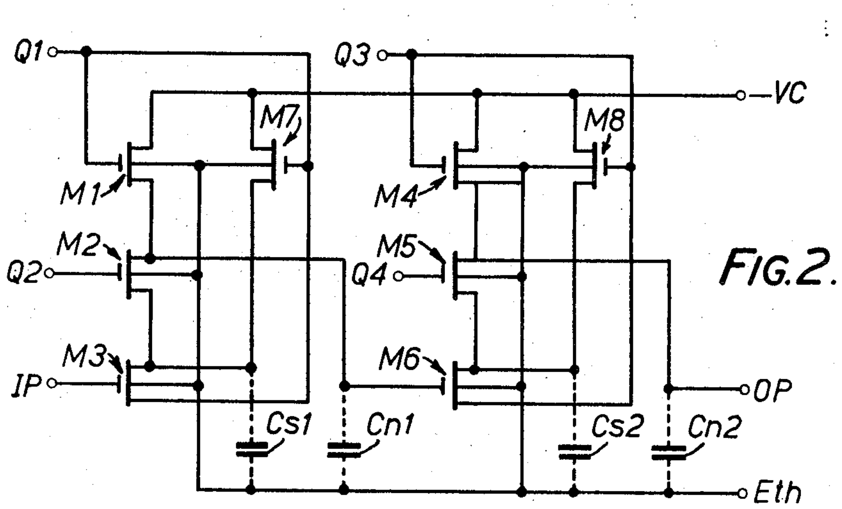
Figure 3:
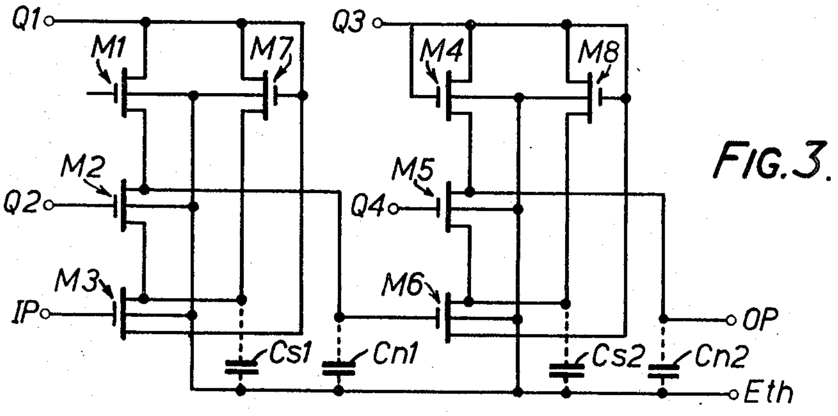

The various features and advantages of the invention will be apparent from the following description of two exemplary embodiments thereof taken in conjunction with the drawings, in which:

FIG. 1 is the circuit drawing of a known four-phase dynamic logic delay circuit, FIG. 2 is the circuit drawing of a four-phase dynamic logic delay circuit in accordance with the invention, and FIG. 3 shows a modification of the arrangement of FIG. 2.

Referring now to FIG. 1, the circuit comprises six FETs M1–M6. The electrode nomenclature is shown on FET M1, where the source, drain, and gate electrodes are shown as *s*, *d*, and *g* respectively, and the substrate or base connection is shown at *b*. It can be seen that all the substrates are connected to the earth rail, the point of highest positive potential. The node capacitance is shown as a bulked capacitor C*n*1 and the spurious capacitance is shown similarly as capacitor C*s*. These capacitances are inherent in the circuit, as mentioned above, and are depicted as separate capacitors purely for convenience of explanation.

If it is now assumed that there is a negative potential (i.e. a logic "1") on the input terminal IP, FET M3 is held in the conducting state between its source and drain electrodes. Capacitance C*s* is therefore shunted by the source-drain impedance of FET M3 and is discharged. On arrival of the first phase clock pulse on terminal Q1, FET M1 conducts and capacitance C*n*1 is charged to the full negative rail potential. On the disconnection of the first phase clock pulse, FET M1 ceases to conduct and capacitor C*n*1 remains charged for its time constant period. The input to the second half of the delay circuit, comprising FETs M4–M6, is thus preset to a logic "1" state due to the negative potential held on the gate of FET M6 by the charge on capacitance C*n*1.

The second phase clock pulse appears at terminal Q2 and causes FET M2 to conduct. FET M3 is already conducting due to the logic "1" on its gate electrode and a discharge path is provided for the capacitance C*n*1 via FETs M2 and M3 in series to earth. At the end of the second phase clock pulse, therefore, the output of the delay stage of the first half of the circuit, comprising FETs M1 to M3, is the inverse of the input since, with capacitance C*n*1 fully discharged, the input on the gate electrode of FET M6 is a logic "0."

The delay stage forming the second half of the delay circuit is identical to the first half, but it is controlled by the third and fourth phase clock pulses appearing sequentially at terminals Q3 and Q4. Subsequent delay circuits are the same as the circuit shown and a node capacitance C*n*2 is therefore present between the output terminal OP and earth.

The third phase clock pulse appearing at terminal Q3 causes FET M4 to conduct and capacitance C*n*2 is charged in the same manner as capacitance C*n*1 on the first phase clock pulse. With a logic "0" at its gate electrode, FET M6 is not conducting. When the fourth phase clock pulse appears at terminal Q4 and causes FET M5 to conduct, capacitance Cn2 is not discharged since FET M6 is not conducting. At the end of the complete cycle of four clock pulses, therefore, a logic "1" appears at the output, i.e., the same as the input but one complete cycle later. Each of the delay stages acts as a half-cycle delay inverter such that, in a similar manner described above, a logic "0" at the input appears at the output one complete cycle later. In this case, the first stage performs in the manner just described for the second stage. The appearance of the first phase clock pulse at terminal Q1 charges the node capacitance Cn1 as previously described. If it be assumed that the spurious capacitance Cs has no charge, then when FET M2 is caused to conduct by the appearance of the second phase clock pulse at its gate electrode, capacitance Cs is connected in parallel with the charged capacitance Cn1. There is no discharge path to earth in this case since FET M3 is not conducting (logic "0" at its gate electrode). The charge on capacitance Cn1 is therefore shared with capacitance Cs and the potential on the gate electrode of FET M6 is reduced, and no longer has the value of the full logic "1" potential.

FIG. 2 shows an improved form of the circuit of FIG. 1 in which this disadvantage of charge sharing is overcome. The component nomenclature is the same as in FIG. 1 and two extra FETs M7 and M8, have been added. The basic functioning of the circuit is the same as described in connection with FIG. 1 but, in this case, means are provided to charge the capacitance Cs at the same time as capacitance Cn with the result that no charge sharing can take place.

The appearance of the first phase clock pulse at terminal Q1 causes FETs M1 and M7 to conduct. Capacitance Cn1 is charged to the clock pulse potential via FET M1 and capacitance Cs1 is charged to the same potential via FET M7. At the end of the first phase clock pulse, terminal Q1 returns to earth potential. With a logic "1" on the input terminal IP, both capacitances discharge to the earth on terminal Q1 via FET M3 when the second phase clock pulse on terminal Q2 causes FET M2 to conduct. With a logic "0" on the input terminal IP, no discharge path is provided via FET M3 when FET M2 conducts and capacitances Cn1 and Cs1 are placed in parallel. Since both capacitors are charged to the same potential, the potential is maintained at a full logic "1" on the gate electrode of FET M6. In a similar fashion, FET M8 precharges capacitance Cs2 during the third phase clock pulse.

It can be seen that the source electrode of FET M3 which was previously connected to the earth rail is now connected to terminal Q1. This is necessary to prevent capacitance Cs1 from being shunted to earth during the charging period of the first phase clock pulse if a logic "1" exists at the input IP (FET M3 conducting). Similarly, the source electrode of FET M6 is connected to terminal Q3.

FIG. 3 shows an alternative method of connecting the FETs M1, M4, M7 and M8 of FIG. 2; the rest of the circuit being identical with that shown in FIG. 2. In this case the drain electrode of these FETs are connected to the clock pulse terminals Q1 and Q3. Since these FETs are only required to conduct during their respective clock pulse periods, it is more convenient to derive the negative potentials for both the gate and drain electrodes from the one source. This saves considerable space in the layout of the microcircuit on the silicon "chip" since the need for negative rail metallising and a bonding pad is eliminated. The need for a separate negative potential source is also eliminated.

What we claim is:

1. A clock controlled electronic delay stage comprising first and second field effect transistors, said first transistor having its drain electrode connected to a capacitative output storage means and its source electrode connected to the drain electrode of said second transistor, means for applying an input signal to the gate electrode of said second transistor, means for applying the first one of two consecutive clock pulses to both the drain and source electrodes of said second transistor and to the drain electrode of said first transistor, and means for applying the second of said two clock pulses to the gate electrode of said first transistor, whereby an input signal applied to the gate electrode of said second transistor appears in inverted form at said output storage means with a delay determined by the clock pulse frequency.

2. A delay stage as claimed in claim 1 wherein said means for applying said first clock pulse includes a third field effect transistor arranged to apply said first clock pulse to the drain electrode of said first transistor and a fourth field effect transistor arranged to apply said first clock pulse to the drain electrode of said second transistor.

3. A delay stage as claimed in claim 2 wherein the gate electrodes of said third and fourth transistors are connected in common to a source of said first clock pulse and the drain electrodes of said third and fourth transistors are connected in common to a voltage supply rail.

4. A delay stage as claimed in claim 2 wherein both the gate and drain electrodes of said third and fourth transistors are connected in common to a source of said first clock pulse.

5. A clock controlled electronic delay circuit comprising two identical delay stages as claimed in claim 1 with the node capacitance of the second transistor of the second delay stage arranged as the capacitative output storage means of the first delay stage and with the clock pulse applying means of the two stages arranged to apply the first and second of four consecutive clock pulses to said first stage and the third and fourth of said clock pulses to said second stage.

References Cited

UNITED STATES PATENTS

| | | | |
|---|---|---|---|
| 3,322,974 | 5/1967 | Ahorns et al. | 307—279 |
| 3,393,325 | 7/1968 | Borror et al. | 307—205 |

STANLEY T. KRAWCZEWICZ, Primary Examiner

U.S. Cl. X.R.

307—246, 251